United States Patent
Seligmann et al.

(10) Patent No.: US 7,392,048 B2
(45) Date of Patent: *Jun. 24, 2008

(54) PEER-TO-PEER DISCOVERY FOR LOCATION-BASED FORWARDING

(75) Inventors: Doree Duncan Seligmann, New York, NY (US); Michael J. Sammon, Watchung, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 114 days.

This patent is subject to a terminal disclaimer.

(21) Appl. No.: 11/169,552

(22) Filed: Jun. 29, 2005

(65) Prior Publication Data

US 2005/0250482 A1 Nov. 10, 2005

Related U.S. Application Data

(63) Continuation of application No. 10/375,641, filed on Feb. 27, 2003, now Pat. No. 6,928,279.

(51) Int. Cl.
*H04B 5/00* (2006.01)
(52) U.S. Cl. .......................... 455/426; 455/417; 455/41
(58) Field of Classification Search .............. 455/414.1, 455/416, 417; 379/211.01, 211.02
See application file for complete search history.

(56) References Cited

U.S. PATENT DOCUMENTS

| 5,481,590 | A | 1/1996 | Grimes |
| 5,790,974 | A | 8/1998 | Tognazzini |
| 5,938,721 | A | 8/1999 | Dussell et al. |
| 6,026,156 | A | 2/2000 | Epler et al. |
| 6,222,482 | B1 | 4/2001 | Gueziec |
| 6,356,533 | B1 | 3/2002 | Bruno et al. |
| 6,411,687 | B1 | 6/2002 | Bohacek et al. |
| 6,434,404 | B1 | 8/2002 | Claxton et al. |
| 6,535,748 | B1 | 3/2003 | Vuorio et al. |
| 6,542,584 | B1 | 4/2003 | Sherwood et al. |
| 2002/0059434 | A1 | 5/2002 | Karaoguz et al. |
| 2002/0086680 | A1 | 7/2002 | Hunzinger |
| 2002/0089421 | A1 | 7/2002 | Farringdon et al. |
| 2003/0039339 | A1 | 2/2003 | Luehrig et al. |
| 2003/0040308 | A1* | 2/2003 | Gieseke ...................... 455/426 |
| 2003/0054865 | A1 | 3/2003 | Byers et al. |
| 2003/0186676 | A1* | 10/2003 | Ogman et al. ................ 455/403 |
| 2004/0072558 | A1* | 4/2004 | Van Bosch ................... 455/417 |
| 2006/0079222 | A1* | 4/2006 | Martin ........................ 455/423 |

FOREIGN PATENT DOCUMENTS

| EP | 1008946 | 6/2000 |
| EP | 1 172 991 | 1/2002 |
| GB | 2303271 A | 2/1997 |
| JP | 09113599 | 2/1997 |
| WO | WO 97/50231 | 12/1997 |

\* cited by examiner

*Primary Examiner*—Creighton H Smith
(74) *Attorney, Agent, or Firm*—Demont & Breyer LLC

(57) ABSTRACT

An apparatus for enabling signals directed to a first telecommunications terminal to be forwarded intelligently to a second telecommunications terminal in the vicinity of the first terminal is disclosed. In particular, the illustrative embodiment automatically forwards signals from a first terminal to the closest terminal in the network that the first terminal is authorized to forward to. The closest authorized terminal is determined via short-range wireless communication between the first terminal and other terminals in the first terminal's vicinity. In the illustrative embodiment, the terminals communicate with each other via Bluetooth transceivers.

18 Claims, 4 Drawing Sheets

US 7,392,048 B2

PEER-TO-PEER DISCOVERY FOR LOCATION-BASED FORWARDING

CROSS-REFERENCE TO RELATED APPLICATIONS

This application is a continuation of U.S. patent application Ser. No. 10/375,641, filed 27 Feb. 2003, entitled "Peer-to-Peer Discovery For Location-Based Forwarding," which is also incorporated by reference. The following patent applications are incorporated by reference:
1. U.S. patent application Ser. No. 10/375,663, filed 27 Feb. 2003, entitled "Authorization-Based Forwarding,";
2. U.S. patent application Ser. No. 10/375,252, filed 27 Feb. 2003, entitled "Location-Based Forwarding,";
3. U.S. patent application Ser. No. 10/375,271, filed 27 Feb. 2003, entitled "Client/Server Discovery For Location-Based Forwarding,"; and
4. U.S. patent application Ser. No. 10/375,237, filed 27 Feb. 2003, entitled "Location-Based Forwarding Over Multiple Networks,".

FIELD OF THE INVENTION

The present invention relates to telecommunications in general, and, in particular, to forwarding a call or message from one telecommunications terminal to another.

BACKGROUND OF THE INVENTION

Telephone calls are sometimes forwarded from one telephone to another. For example, when a user leaves his or her office to work in a computer laboratory, the user might forward his or her office telephone to a telephone in the computer laboratory. The user thereby specifies ahead-of-time that any future call directed to his or her office telephone should be redirected to the telephone in the computer laboratory (i.e., a call directed to the office telephone will cause the computer laboratory telephone to "ring," while the office telephone will not ring).

As another example, when the user receives a call on his or her office telephone, he or she might wish to transfer the call to another telephone (e.g., a secretary's telephone, etc.) while the call is in progress. Alternatively, the user might wish to include another party in the conversation by bridging the call to an appropriate telephone; this is also known as conference calling.

Forwarding is also commonly employed for email. In particular, a forwarding mechanism is established (e.g., creating a forward file in a UNIX-based system, etc.) so that future email messages addressed to a first address are automatically forwarded to a second address.

SUMMARY OF THE INVENTION

The present invention is a method for enabling signals (e.g., voice, video, text, etc.) directed to a first telecommunications terminal (e.g., telephone, computer, pager, etc.) to be forwarded to a second telecommunications terminal, which is or was in the "vicinity" of the first terminal. In particular, the illustrative embodiment automatically forwards signals directed to a first telecommunications terminal to the closest telecommunications terminal that the first terminal is authorized to forward to.

The illustrative embodiment comprises: a transmitter for broadcasting a query to at least one telecommunications terminal, wherein said query requests the telecommunications terminal's location; a receiver for receiving the locations from the telecommunications terminals; and a processor for (i) selecting one of the telecommunications terminals based on the locations and the apparatus' location, and (ii) sending a forwarding message that causes a signal directed to the apparatus to be forwarded to the selected telecommunications terminal.

DETAILED DESCRIPTION

Figure 1:
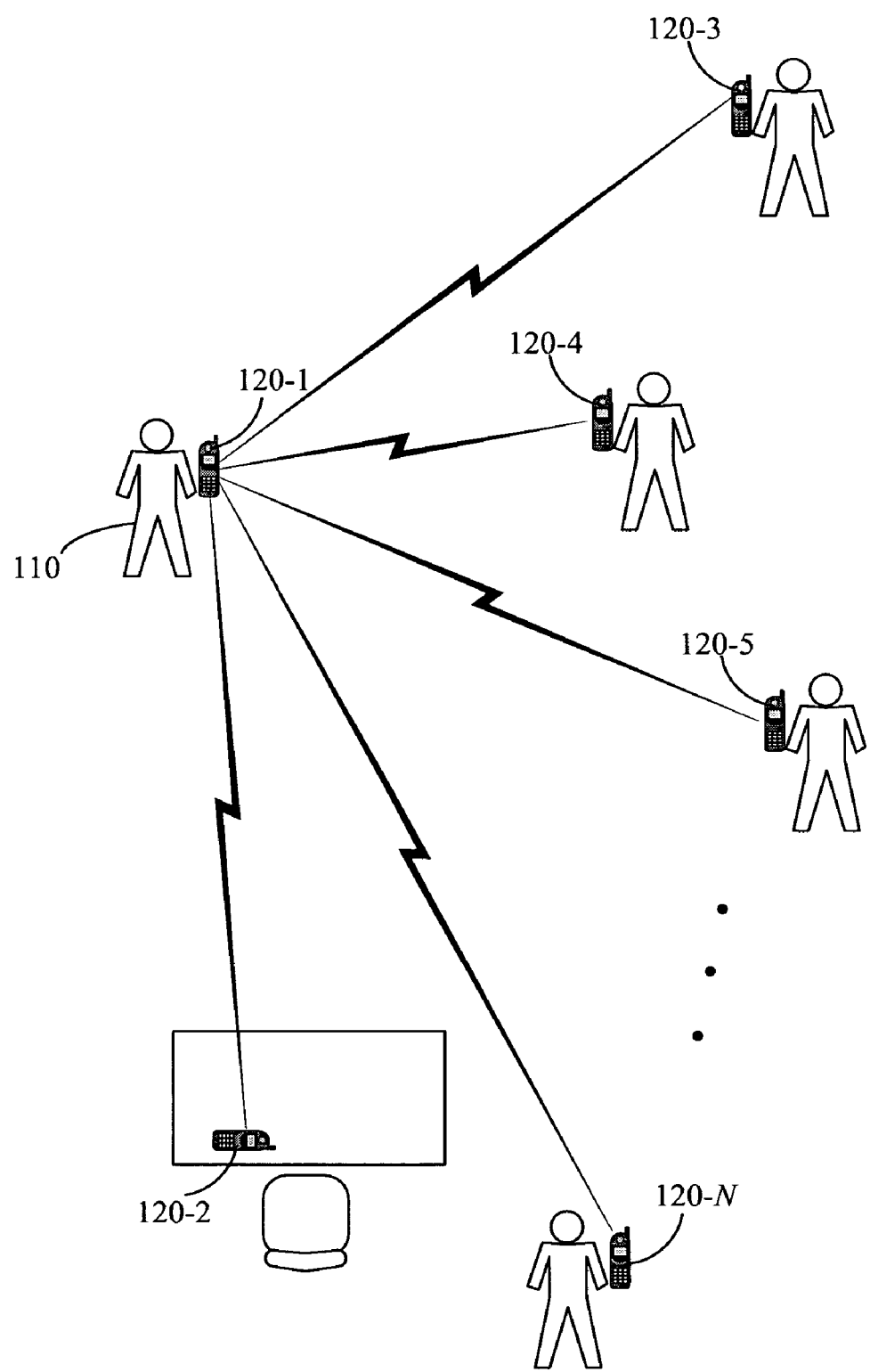
FIG. 1 depicts a representational diagram of the communications behavior of wireless telecommunications terminals 120-1 through 120-N, in accordance with the illustrative embodiment of the present invention.

Definitions—Although the illustrative embodiment is disclosed in the context of telephones, it will be clear to those skilled in the art how to use embodiments of the present invention for other devices such as pagers, personal digital assistants (PDAs), etc. Consequently, the term "contact identifier" and its inflected forms are defined as a string of symbols that uniquely specifies a telecommunications terminal (e.g., telephone number, email address, Internet Protocol (IP) address, etc.). Similarly, for the purposes of this specification the term "call" is defined to encompass all kinds of communications (e.g. telephone call, email message, interactive text chat, videoconference, etc.), and it will be clear to those skilled in the art how to use embodiments of the present invention for such alternative means of communication.

For the purposes of this specification, the term "forwarding out" and its inflected forms are defined as forwarding a call from a first telecommunications terminal to a second telecommunications terminal as a result of a forwarding request originating at the first telecommunications terminal. Similarly, for the purposes of this specification the term "forwarding in" and its inflected forms are defined as forwarding a call from a first telecommunications terminal to a second telecommunications terminal as a result of a forwarding request originating at the second telecommunications terminal.

For some kinds of communication, such as telephone calls and interactive text chat, forwarding can be established either (i) before a call is initiated, or (ii) during a call (i.e., while a call is in progress). For some other kinds of communication such as email, however, forwarding typically applies to (i) only.

For case (i), a call can be forwarded from a first terminal to a second terminal so that either (ia) only the second terminal is notified of the incoming call (i.e., only the second terminal "rings"), or (ib) both the first and second terminals are notified of the incoming call (i.e., both terminals ring). For case (ii), a call can be forwarded from a first terminal to a second terminal so that either (iia) the first communications terminal no longer participates in the call (i.e., only the second terminal participates), or (iib) the first terminal still participates in the call (i.e., both terminals participate).

Consequently, for the purposes of this specification: the term "redirecting" and its inflected forms are defined as forwarding a call or message in accordance with (ia) above; the term "connecting" and its inflected forms are defined as forwarding a call or message in accordance with (ib) above; the term "transferring" and its inflected forms are defined as forwarding a call or message in accordance with (iia) above; and the term "bridging" and its inflected forms are defined as forwarding a call or message in accordance with (iib) above.

In addition, for the purposes of this specification: the term "redirecting out" and its inflected forms are defined as forwarding out a call or message in accordance with (ia) above; the term "connecting out" and its inflected forms are defined as forwarding out a call or message in accordance with (ib) above; the term "transferring out" and its inflected forms are defined as forwarding out a call or message in accordance with (iia) above; and the term "bridging out" and its inflected forms are defined as forwarding out a call or message in accordance with (iib) above.

Similarly, for the purposes of this specification: the term "redirecting in" and its inflected forms are defined as forwarding in a call or message in accordance with (ia) above; the term "connecting in" and its inflected forms are defined as forwarding in a call or message in accordance with (ib) above; the term "transferring in" and its inflected forms are defined as forwarding in a call or message in accordance with (iia) above; and the term "bridging in" and its inflected forms are defined as forwarding in a call or message in accordance with (iib) above.

The Illustrative Embodiment—FIG. 1 depicts a representational diagram of the communications behavior of wireless telecommunications terminals 120-1 through 120-N, in accordance with the illustrative embodiment of the present invention. As shown in FIG. 1, wireless telecommunications terminal 120-1 belongs to user 110, and is in the vicinity of other wireless telecommunications terminals 120-2 through 120-N, where N is an integer greater than 1.

Each telecommunications terminal 120-$i$ can communicate wirelessly with other telecommunications terminals over longer distances (e.g., via a cellular network, etc.), and with other telecommunications terminals over shorter distances via Bluetooth, as is well-known in the art. In accordance with the illustrative embodiment of the present invention, when user 110 submits a forwarding out operation on his or her telecommunications terminal 120-1, telecommunications terminal 120-1 communicates with terminals 120-2 through 120-N, determines which terminal is closest, and automatically forwards to that terminal. Similarly, a forwarding in operation submitted by telecommunications terminal 120-$i$ automatically forwards signals from the closest terminal to terminal 120-$i$. The exact nature of these communications, as well as how the closest terminal is determined, is disclosed below in the detailed descriptions of FIGS. 3 and 4.

Although Bluetooth is employed in the illustrative embodiment of the present invention for communications between terminals 120-$i$, it will be clear to those skilled in the art how to make and use embodiments that employ an alternative short-range wireless technology.

In some embodiments, an authorization facility might be employed to prevent forwarding of calls from a first telecommunications terminal to a second telecommunications terminal when such forwarding is not authorized. In such embodiments, a telecommunications terminal 120-$i$ that submits a forwarding operation (e.g., transfer out, etc.) automatically forwards to/from the closest telecommunications terminal for which terminal 120-$i$ is authorized to do so.

Co-pending U.S. patent application "Authorization-Based Forwarding," discloses an authorization facility that employs tables associated with each telecommunications terminal that indicate whether a particular forwarding operation is allowed. As disclosed below in the description of FIGS. 2, 3, and 4, the illustrative embodiment of the present invention employs the authorization facility of the above-referenced U.S. patent application. In lieu of storing authorization tables in a centralized database, however, as is disclosed in the illustrative embodiment of the above-referenced U.S. patent application, the illustrative embodiment of the present invention stores authorization tables for each particular telecommunications terminal 120-$i$ in the terminal itself.

As will be appreciated by those skilled in the art, in some other embodiments an alternative technique might be used to enforce forwarding permissions. A wide variety of such authorization techniques are well known in the art, and it will be clear to those skilled in the art how to incorporate such techniques into the illustrative embodiment of the present invention.

Figure 2:
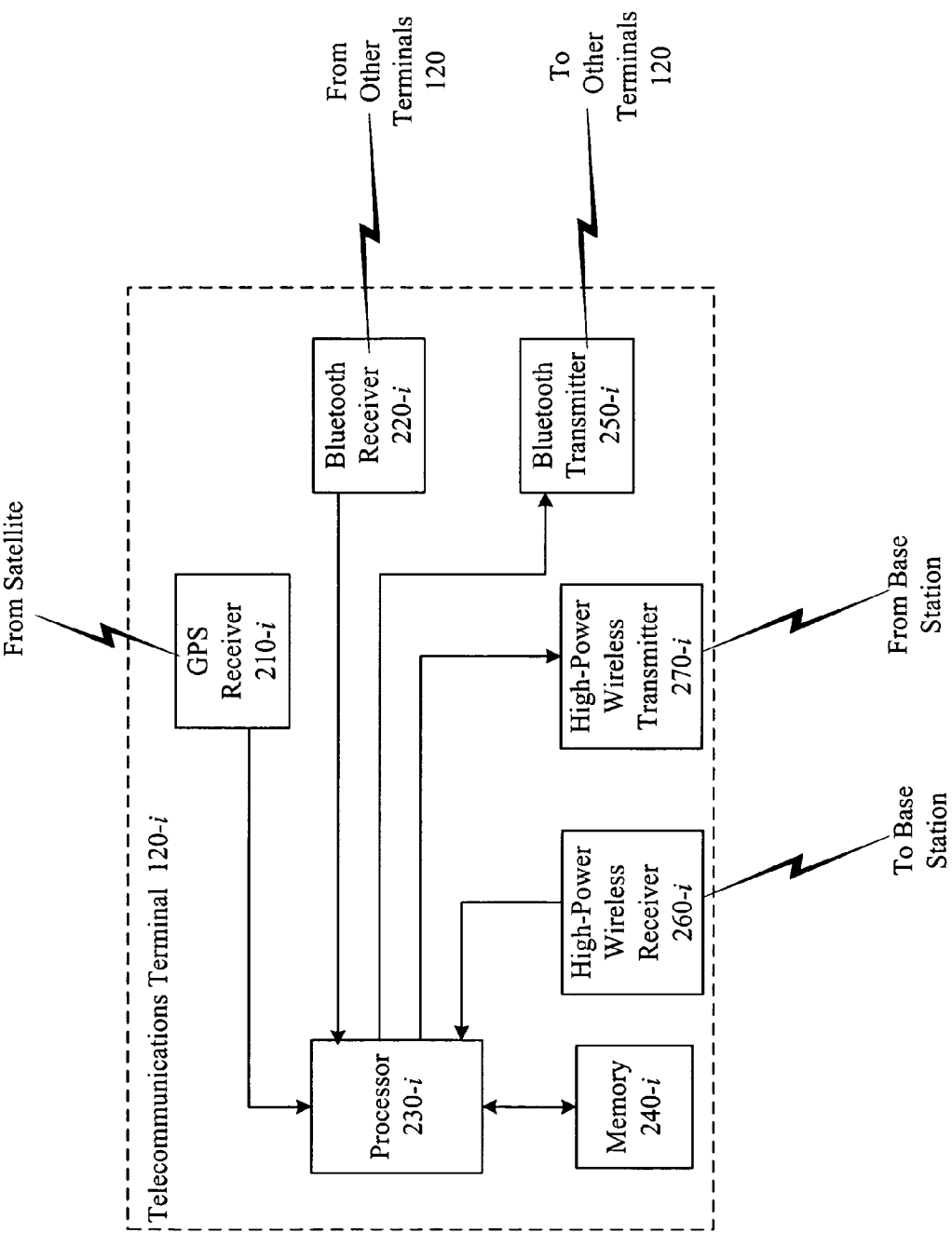
FIG. 2 depicts a block diagram of the salient components of wireless telecommunications terminal 120-$i$, as depicted in FIG. 1, in accordance with the illustrative embodiment of the present invention.

FIG. 2 depicts a block diagram of the salient components of wireless telecommunications terminal 120-$i$, as depicted in FIG. 1, in accordance with the illustrative embodiment of the present invention. As shown in FIG. 2, wireless telecommunications terminal 120-$i$ comprises global positioning system (GPS) receiver 210-$i$, Bluetooth receiver 220-$i$, processor 230-$i$, memory 240-$i$, Bluetooth transmitter 250-$i$, high-power wireless receiver 260-$i$, and high-power wireless receiver 270-$i$. The descriptions of FIGS. 3 and 4 below disclose the operation of these components when telecommunications terminal 120-$i$ (i) submits a forwarding request, and (ii) receives a query from another terminal, respectively.

GPS receiver 210-$i$ receives satellite-based signals for determining global position, as is well understood in the art, and sends this information to processor 230-$i$. It will be clear to persons skilled in the art that some embodiments might employ means other than satellite-based signals for determining geo-location (e.g., triangulation, radio beacons, radio-frequency fingerprinting [U.S. Pat. No. 6,393,294, incorporated by reference], etc.) In such embodiments, an appropriate receiver (e.g., radio-frequency receiver, etc.) would be substituted for GPS receiver 220-$i$, as is well understood in the art.

Bluetooth receiver 220-$i$ receives short-range wireless signals in accordance with the Bluetooth protocol, as is well-known in the art.

Processor 230-$i$: receives signals from GPS receiver 210-$i$, Bluetooth receiver 220-$i$, and high-power wireless receiver 260-$i$; sends signals to Bluetooth transmitter 250-$i$ and high-power wireless transmitter 270-$i$; and reads and writes data to/from memory 240-$i$, as is well understood in the art. As will be appreciated by those skilled in the art, processor 230-$i$ might be a programmed general-purpose processor, or a "hard-wired" or special-purpose processor.

Memory 240-$i$ stores authorization tables pertaining to telecommunications terminal 120-$i$, as described above, and the current location of telecommunications terminal 120-$i$, as received by GPS receiver 210-$i$, described above. As will be appreciated by those skilled in the art, memory 240-$i$ can take a variety of forms, such as a random-access memory, a flash memory, a disk drive, etc.

Bluetooth transmitter 250-$i$ transmits short-range wireless signals in accordance with the Bluetooth protocol, as is well-known in the art.

High-power wireless receiver 260-$i$ receives longer-range signals (e.g., cellular telephone signals, etc.), as is well-known in the art.

Similarly, high-power wireless transmitter 270-$i$ transmits longer-range signals, as is well-known in the art.

Figure 3:
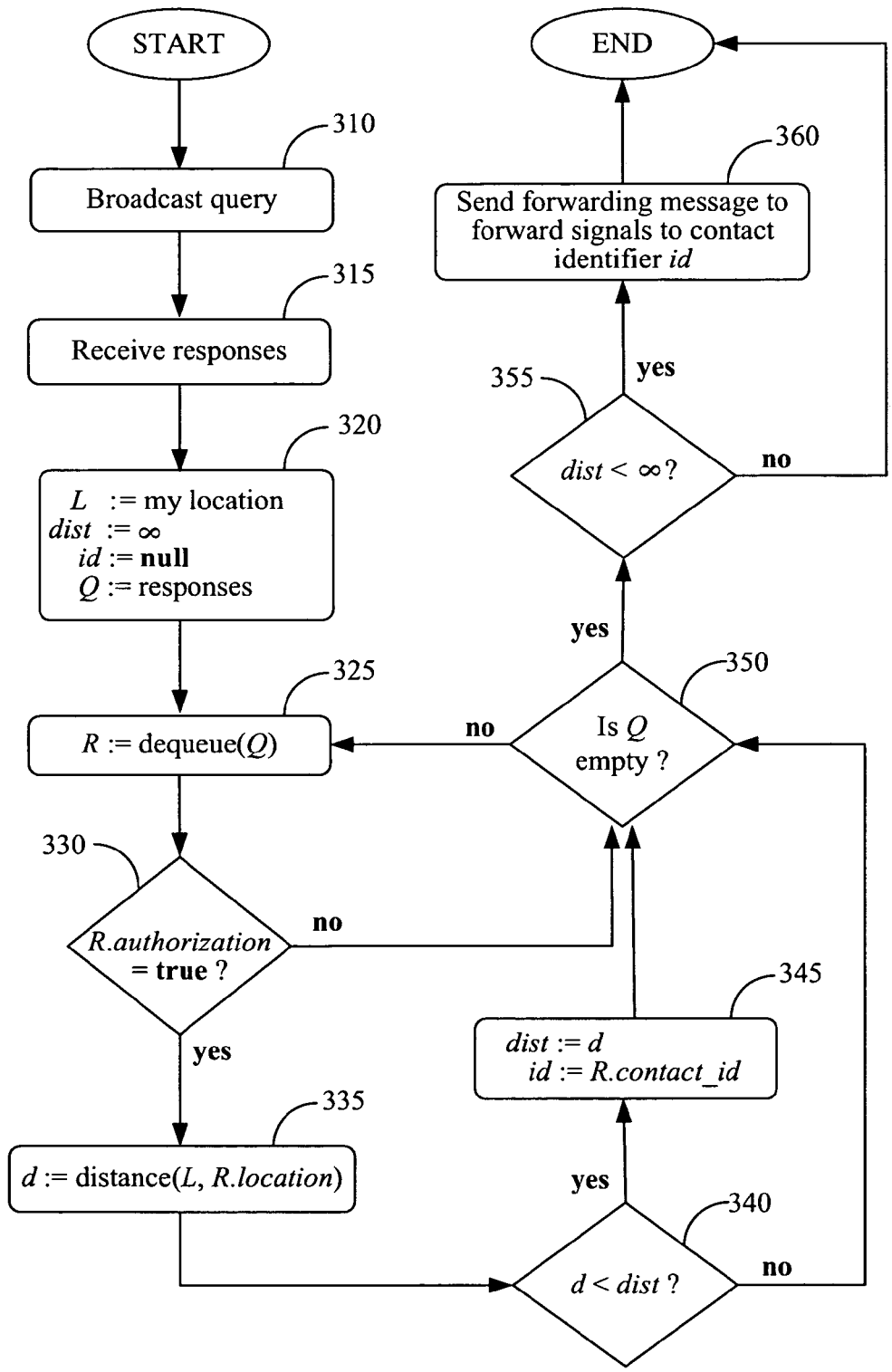
FIG. 3 depicts a flowchart of the operation of wireless telecommunications terminal 120-$i$, as depicted in FIG. 1, for forwarding signals in accordance with the illustrative embodiment of the present invention.

FIG. 3 depicts a flowchart 300 of the operation of wireless telecommunications terminal 120-$i$ for forwarding signals, in accordance with the illustrative embodiment of the present invention.

At task 310, Bluetooth transmitter 250-$i$ broadcasts a query to Bluetooth-enabled telecommunications terminals in its vicinity, as is well understood in the art. The query specifies terminal 120-$i$'s contact identifier and a forwarding operation (e.g., transfer out, bridge in, etc.), and requests each recipient's respective contact identifier and location.

At task 315, Bluetooth receiver 220-$i$ receives responses to the query. As disclosed below in the description of FIG. 4, a recipient 120-$j$ that does not permit terminal 120-$i$ to perform the specified forwarding operation sends a response to terminal 120-$i$ with an authorization flag of false.

At task 320, processor 230-$i$ sets, in memory 240-$i$: variable L to terminal 120-$i$'s location, as determined by GPS receiver 210-$i$; variable dist to infinity ($\infty$); variable id to null; and variable Q to reference a queue containing the received responses. Each response in Q contains a plurality of items, the first of which is a Boolean authorization flag that indicates whether the sender of the response, say 210-$j$, allows terminal 120-$i$ to forward to/from terminal 120-$j$ via the specified forwarding operation. As disclosed below in the description of FIG. 4, if the value of this flag is true, then the response also contains the sender's contact identifier and location; otherwise the response does not contain any further information.

At task 325, processor 230-$i$ removes the response at the head of queue Q and stores the response in variable R.

At task 330, processor 230-$i$ checks whether R's authorization flag is true. If it is, execution proceeds to task 335; otherwise, execution proceeds to task 350.

At task 335, processor 230-$i$ computes the distance between location L and the location of the sender of response R, and stores this distance in variable d.

At task 340, processor 230-$i$ compares the value of variables d and dist. If d is smaller, then execution proceeds to task 345; otherwise execution proceeds to task 350.

At task 345, processor 230-$i$ copies the value of d into dist, and stores the contact identifier of the sender of response R in variable id.

At task 350, processor 230-$i$ checks whether queue Q is empty. If it is, execution proceeds to task 355; otherwise execution goes back to task 325 for the next iteration.

At task 355, processor 230-$i$ checks whether the value of variable dist is less than infinity. If it is (i.e., some terminal responded with a true authorization flag), then execution proceeds to task 360; otherwise flowchart 300 terminates.

At task 360, processor 230-$i$ sends, via high-power transmitter 270-$i$, a forwarding message to the long-range wireless network (e.g., cellular service provider, etc.) to which terminal 120-$i$ is connected; this message specifies terminal 120-$i$'s contact identifier, and id. As is well understood in the art, for forwarding out of telephone calls, the forwarding message is routed to the appropriate telephony switch, which causes: (i) the forward flag to be enabled in the record for terminal 120-$i$'s contact identifier, and (ii) the forwarding number in this record to be set to id (or vice versa for forwarding in operations). For forwarding out of email messages, the forwarding message is directed to the appropriate email server to establish forwarding of messages directed to terminal 120-$i$'s contact identifier (i.e., email address) to id (or vice versa for forwarding in operations), as is well understood in the art. For peer-to-peer communications employing the Session Initiation Protocol (SIP), such as instant messaging (IM), the forwarding message is directed to the appropriate SIP server; for forwarding out operations, this message specifies updating terminal 120-$i$'s contact identifier (i.e., IP address) to id (or vice versa for forwarding in operations), as is well understood in the art.

Figure 4:
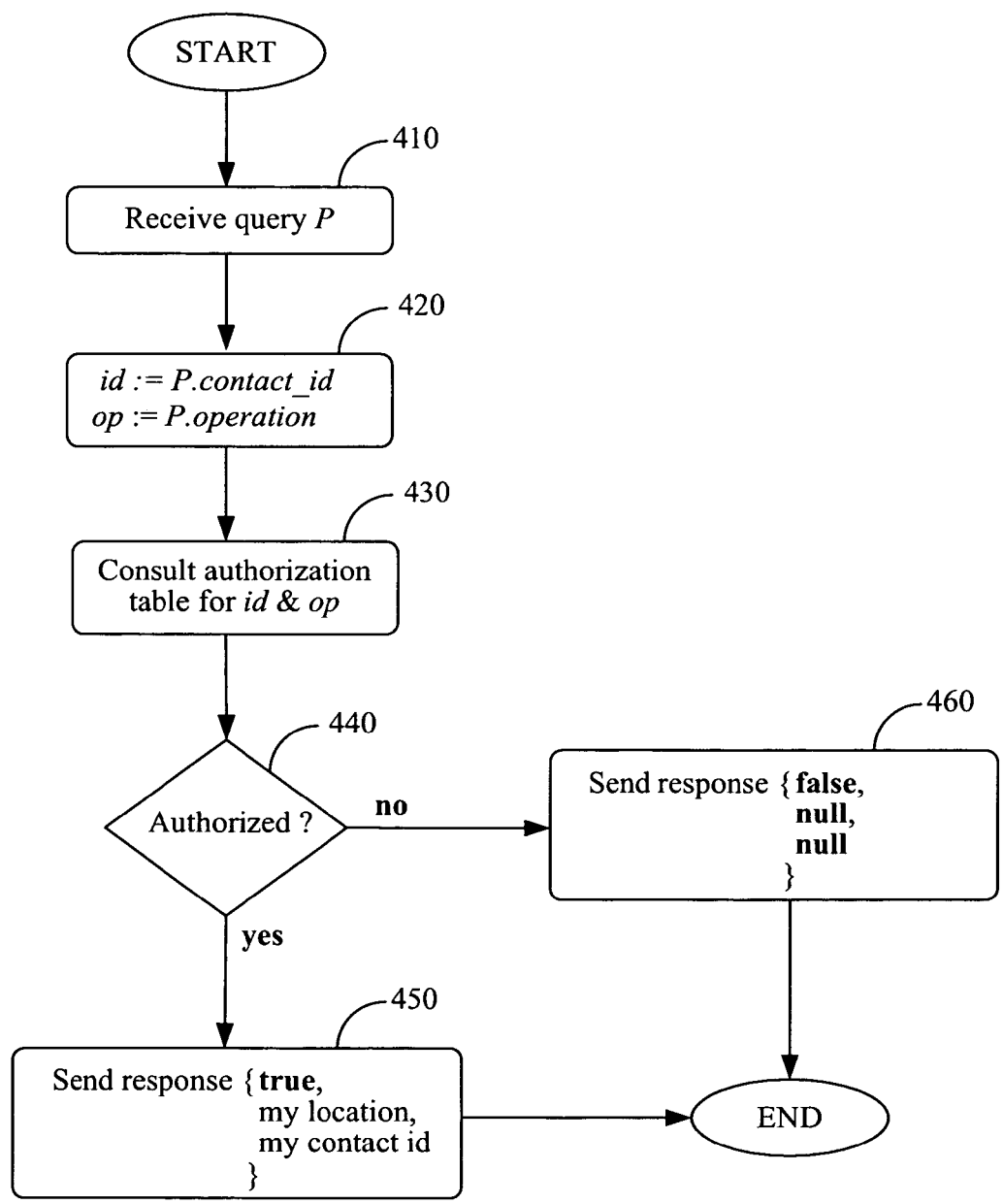
FIG. 4 depicts a flowchart of the operation of wireless telecommunications terminal 120-$i$, as depicted in FIG. 1, upon receiving a query from another telecommunications terminal 120-$j$, as depicted in FIG. 1, in accordance with the illustrative embodiment of the present invention.

FIG. 4 depicts a flowchart of the operation of wireless telecommunications terminal 120-$i$ upon receiving a query from another telecommunications terminal 120-$j$, in accordance with the illustrative embodiment of the present invention.

At task 410, Bluetooth receiver 220-$i$ receives a query P via the Bluetooth protocol, as is well understood in the art.

At task 420, processor 230-$i$ sets, in memory 240-$i$ (1) variable id to the contact identifier of the sender of query P, and (2) variable op to the forwarding operation specified in query P.

At task 430, processor 230-$i$ looks up, in memory 240-$i$, the authorization table entry corresponding to identifier id and operation op, in well-known fashion.

At task 440, processor 230-$i$ determines whether to proceed to task 450 or task 460. If the table entry in task 430 indicates that terminal 120-$j$ is authorized to perform operation op, execution proceeds to task 450; otherwise, execution proceeds to task 460.

At task 450, processor 230-$i$ sends, via Bluetooth transmitter 250-$i$, a response to terminal 120-$j$ comprising: a true authorization flag; the location of terminal 120-$i$, as determined by GPS receiver 210-$i$; and terminal 120-$i$'s contact identifier. After sending the response, flowchart 400 terminates.

At task 460, processor 230-$i$ sends, via Bluetooth transmitter 250-$i$, a response to terminal 120-$j$ comprising: a false authorization flag; a null location, and a null contact identifier. After sending the response, flowchart 400 terminates.

In some embodiments, task 460 might not be performed, in which case flowchart 400 terminates with processor 230-$i$ effectively declining to send a response to 120-$j$, rather than sending a response with a false authorization flag. As will be appreciated by those skilled in the art, in such embodiments the result (i.e., the terminal selected for forwarding) is the same as in the illustrative embodiment.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
receiving at a first telecommunications terminal a first peer-to-peer wireless signal from a second telecommunications terminal, wherein said first peer-to-peer wireless signal is in response to a second peer-to-peer signal that is transmitted by said first telecommunications terminal; and
transmitting a message that causes a signal that is directed to said first telecommunications terminal to be forwarded to said second telecommunications terminal.

2. A method comprising:
receiving at a first telecommunications terminal a first peer-to-peer wireless signal from a second telecommunications terminal, wherein said first peer-to-peer wireless signal comprises a forwarding permission that indicates whether said second telecommunications terminal authorizes the forwarding of signals that are directed to said first telecommunications terminal to said second telecommunications terminal; and transmitting, only when said forwarding permission is true, a message that causes a signal that is directed to said first telecommunications terminal to be forwarded to said second telecommunications terminal.

3. The method of claim 2 wherein said first peer-to-peer wireless signal is in response to a second peer-to-peer signal that is transmitted by said first telecommunications terminal.

4. The method of claim 3 wherein said second peer-to-peer wireless signal specifies a forwarding operation, and wherein whether said second telecommunications terminal authorizes said forwarding of signals is based on said forwarding operation, and wherein said message causes a signal that is directed to said first telecommunications terminal to be forwarded to said second telecommunications terminal in accordance with said forwarding operation.

5. The method of claim 4 wherein said forwarding operation is redirecting out.

6. The method of claim 4 wherein said forwarding operation is transferring out.

7. A method comprising:

receiving at a first telecommunications terminal a first peer-to-peer wireless signal from a second telecommunications terminal, wherein said first peer-to-peer wireless signal is in response to a second peer-to-peer signal that is transmitted by said first telecommunications terminal; and transmitting a message that causes a signal that is directed to said second telecommunications terminal to be forwarded to said first telecommunications terminal.

8. A method comprising:

receiving at a first telecommunications terminal a first peer-to-peer wireless signal from a second telecommunications terminal, wherein said first peer-to-peer wireless signal comprises a forwarding permission that indicates whether said second telecommunications terminal consents to the forwarding of signals that are directed to said second telecommunications terminal to said first telecommunications terminal; and transmitting, only when said forwarding permission is true, a message that causes a signal that is directed to said second telecommunications terminal to be forwarded to said first telecommunications terminal.

9. The method of claim 8 wherein said first peer-to-peer wireless signal is in response to a second peer-to-peer signal that is transmitted by said first telecommunications terminal.

10. The method of claim 9 wherein said second peer-to-peer wireless signal specifies a forwarding operation, and wherein whether said second telecommunications terminal consents to said forwarding of signals is based on said forwarding operation, and wherein said message causes a signal that is directed to said second telecommunications terminal to be forwarded to said first telecommunications terminal in accordance with said forwarding operation.

11. The method of claim 10 wherein said forwarding operation is bridging in.

12. The method of claim 10 wherein said forwarding operation is connecting in.

13. A method comprising:

receiving at a second telecommunications terminal a first peer-to-peer wireless signal from a first telecommunications terminal; and transmitting from said second telecommunications terminal a second peer-to-peer wireless signal to said first telecommunications in response to said first peer-to-peer wireless signal, wherein said second peer-to-peer wireless signal comprises a forwarding permission that indicates whether said second telecommunications terminal authorizes the forwarding of signals that are directed to said first telecommunications terminal to said second telecommunications terminal.

14. The method of claim 13 wherein said first peer-to-peer wireless signal specifies a forwarding operation, and wherein whether said second telecommunications terminal authorizes said forwarding of signals is based on said forwarding operation.

15. The method of claim 13 wherein said second peer-to-peer wireless signal also comprises a contact identifier that is associated with said second telecommunications terminal.

16. A method comprising:

receiving at a second telecommunications terminal a first peer-to-peer wireless signal from a first telecommunications terminal; and transmitting from said second telecommunications terminal a second peer-to-peer wireless signal to said first telecommunications in response to said first peer-to-peer wireless signal, wherein said second peer-to-peer wireless signal comprises a forwarding permission that indicates whether said second telecommunications terminal consents to the forwarding of signals that are directed to said second telecommunications terminal to said first telecommunications terminal.

17. The method of claim 16 wherein said first peer-to-peer wireless signal specifies a forwarding operation, and wherein whether said second telecommunications terminal consents to said forwarding of signals is based on said forwarding operation.

18. The method of claim 16 wherein said second peer-to-peer wireless signal also comprises a contact identifier associated that is with said second telecommunications terminal.

* * * * *